United States Patent
Liu et al.

(10) Patent No.: US 10,169,476 B2
(45) Date of Patent: Jan. 1, 2019

(54) METHOD, APPARATUS, AND COMPUTER-READABLE STORAGE MEDIUM FOR GROUPING SOCIAL NETWORK NODES

(71) Applicant: TENCENT TECHNOLOGY (SHENZHEN) COMPANY LIMITED, Shenzhen, Guangdong (CN)

(72) Inventors: Yuewen Liu, Shenzhen (CN); Chuan Chen, Shenzhen (CN); Peng He, Shenzhen (CN); Junming Mai, Shenzhen (CN); Yuhuang Li, Shenzhen (CN); Weihua Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 588 days.

(21) Appl. No.: 14/401,271

(22) PCT Filed: Jan. 28, 2013

(86) PCT No.: PCT/CN2013/071038
§ 371 (c)(1),
(2) Date: Nov. 14, 2014

(87) PCT Pub. No.: WO2013/170643
PCT Pub. Date: Nov. 21, 2013

(65) Prior Publication Data
US 2015/0134663 A1    May 14, 2015

(30) Foreign Application Priority Data
May 15, 2012   (CN) .......................... 2012 1 0149998

(51) Int. Cl.
*G06F 17/30* (2006.01)
*G06Q 10/10* (2012.01)
*G06Q 50/00* (2012.01)

(52) U.S. Cl.
CPC .. *G06F 17/30876* (2013.01); *G06F 17/30958* (2013.01); *G06Q 10/10* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2008/0086343 A1* | 4/2008 | Pendergraft | G06Q 10/0637 705/7.29 |
| 2009/0177744 A1* | 7/2009 | Marlow | G06Q 10/10 709/204 |

(Continued)

FOREIGN PATENT DOCUMENTS

| | | |
|---|---|---|
| CN | 1848839 A | 10/2006 |
| CN | 101399785 A | 4/2009 |

(Continued)

OTHER PUBLICATIONS

Office Action Issued in Japanese Patent Application No. 2015-511906, dated Feb. 2, 2016.

(Continued)

*Primary Examiner* — Thu N Nguyen
(74) *Attorney, Agent, or Firm* — Morgan, Lewis & Bockius LLP

(57) ABSTRACT

According to an embodiment, a candidate node having a potential association relationship with a target node, an association node having an association relationship with the target node, and a grouping identifier of the association node are obtained. A relevance degree between the association node and the target node and a relevance degree between the (Continued)

candidate node and the target node within each grouping identifier are obtained. Based on the relevance degrees, the association node and the candidate node in each grouping identifier are combined for outputting.

15 Claims, 5 Drawing Sheets

(56) References Cited

U.S. PATENT DOCUMENTS

| | | | |
|---|---|---|---|
| 2010/0095343 A1 | 4/2010 | Kaihotsu | |
| 2011/0173257 A1 | 7/2011 | Tu | |
| 2012/0096014 A1* | 4/2012 | Davids | G06Q 10/10 |
| | | | 707/749 |
| 2012/0215771 A1* | 8/2012 | Steiner | G06F 17/30528 |
| | | | 707/723 |

FOREIGN PATENT DOCUMENTS

| | | |
|---|---|---|
| CN | 101931707 A | 12/2010 |
| CN | 101968818 A | 2/2011 |
| CN | 102270085 A | 12/2011 |
| CN | 102377683 A | 3/2012 |
| JP | 2006/039990 | 2/2006 |
| JP | 2010/093734 | 4/2010 |

OTHER PUBLICATIONS

Kato, Mikio, Link Mining, Analyzing Links to Discover the Growing Pattern of Network, in 10 pages.

Facebook perfect guidebook Part 3, Making Method of Friends and Connections, in 41 pages.

Yokoyama et al., Proposal of SNS Interconnection by Social Graph Conjunction, in 10 pages.

International Preliminary Report on Patentability and Written Opinion of the International Searching Authority for International Application No. PCT/CN2013/071038, dated Nov. 18, 2014, in 6 pages.

Office Action issued in Chinese Patent Application No. 201210149998.2, dated Jan. 4, 2015.

International Search Report for International Application No. PCT/CN2013/071038, dated May 9, 2013.

* cited by examiner

METHOD, APPARATUS, AND COMPUTER-READABLE STORAGE MEDIUM FOR GROUPING SOCIAL NETWORK NODES

CROSS-REFERENCE TO RELATED APPLICATIONS

This application is a U.S. National Phase application under 35 U.S.C. § 371 of International Application No. PCT/CN2013/071038, filed Jan. 28, 2013, entitled "Method, Apparatus, and Computer-Readable Storage Medium for Grouping Social Network Nodes", the entire disclosure of which is incorporated herein by reference.

FIELD OF THE INVENTION

Embodiments of the present disclosure relate to Internet technology, and more particularly, to a method, apparatus, and computer-readable storage medium for grouping social network nodes.

BACKGROUND OF THE INVENTION

Social networks are booming with the development of the Internet technology. The social network includes websites and products that may provide connections between people, including but not limited to instant messaging products, social networking websites, chat rooms, BBS, virtual communities, online games, and so on. In the social network, a user may serve as a node, and there may be a direct buddy relationship or an indirect relationship between users. In other words, there may be an association relationship between nodes, or there may be a potential association relationship between the nodes. The social network may provide the potential association relationship between the nodes, which may facilitate the development of a relationship chain between the nodes, so that the potential association relationship may be transformed into the association relationship. In the social network, a user may be regarded as a target node. A node having the association relationship with the target node may be regarded as an association node, and a node having the potential association relationship with the target node may be regarded as a candidate node. For example, the association node is a buddy of the user and the candidate node is a potential buddy of the user. In this case, the potential buddy may indicate a user who may become a buddy of the user. By this manner, the potential buddy may be recommended to the user, so that an online relationship chain of the user may be developed.

In a traditional social network, the "association node and the candidate node" may be divided into two blocks for presenting to the target node. The target node only interacts data information with the association node, in which there is the association relationship between the target node and the association node. When the target node wants to interact with the candidate node having the potential association relationship with the target node, the candidate node may be required to be transformed into the association node. The target node may search a block where the candidate node locates for the data of the candidate node, which is inconvenient and difficult for the target node to quickly expand the relationship chain of the target node.

SUMMARY OF THE INVENTION

Embodiments of the present disclosure provide a method for grouping social network nodes. The method includes:

obtaining a candidate node having a potential association relationship with a target node, an association node having an association relationship with the target node, and a grouping identifier of the association node;

obtaining a relevance degree between the association node and the target node and a relevance degree between the candidate node and the target node within each grouping identifier; and combining, based on the relevance degrees, the association node and the candidate node in each grouping identifier and outputting the association node and the candidate node.

Embodiments of the present disclosure further provide an apparatus for grouping social network nodes. The apparatus includes:

an extracting module, to obtain a candidate node having a potential association relationship with a target node, an association node having an association relationship with the target node, and a grouping identifier of the association node;

a processing module, to obtain a relevance degree between the association node and the target node and a relevance degree between the candidate node and the target node within each grouping identifier; and an outputting module, to combine, based on the relevance degrees, the association node and the candidate node in each grouping identifier and output the association node and the candidate node.

Embodiments of the present disclosure further provide a non-transitory computer-readable storage medium. The non-transitory computer-readable storage medium is encoded with a plurality of instructions that when executed by one or more computers cause the one or more computers to perform operations comprising:

obtaining a candidate node having a potential association relationship with a target node, an association node having an association relationship with the target node, and a grouping identifier of the association node;

obtaining a relevance degree between the association node and the target node and a relevance degree between the candidate node and the target node within each grouping identifier; and combining, based on the relevance degrees, the association node and the candidate node in each grouping identifier and outputting the association node and the candidate node.

According to various embodiments of the present disclosure, in the method, apparatus, and computer-readable storage medium as described above, the candidate node, the association node, and the grouping identifier of the association node are obtained. The relevance degree between the candidate node and the target node and the relevance degree between the association node within each grouping identifier and the target node are obtained. Based on the relevance degrees, the association node and the candidate node in each grouping identifier are combined for outputting. The method, apparatus, and computer-readable storage medium described in the various embodiments of the present disclosure can facilitate the operation, reduce the operations implemented by the user for adding the candidate node, and improve the response efficiency of the system.

DETAILED DESCRIPTION OF THE INVENTION

Hereinafter, the present disclosure will be described in further detail with reference to the accompanying drawings and exemplary embodiments.

Figure 1:
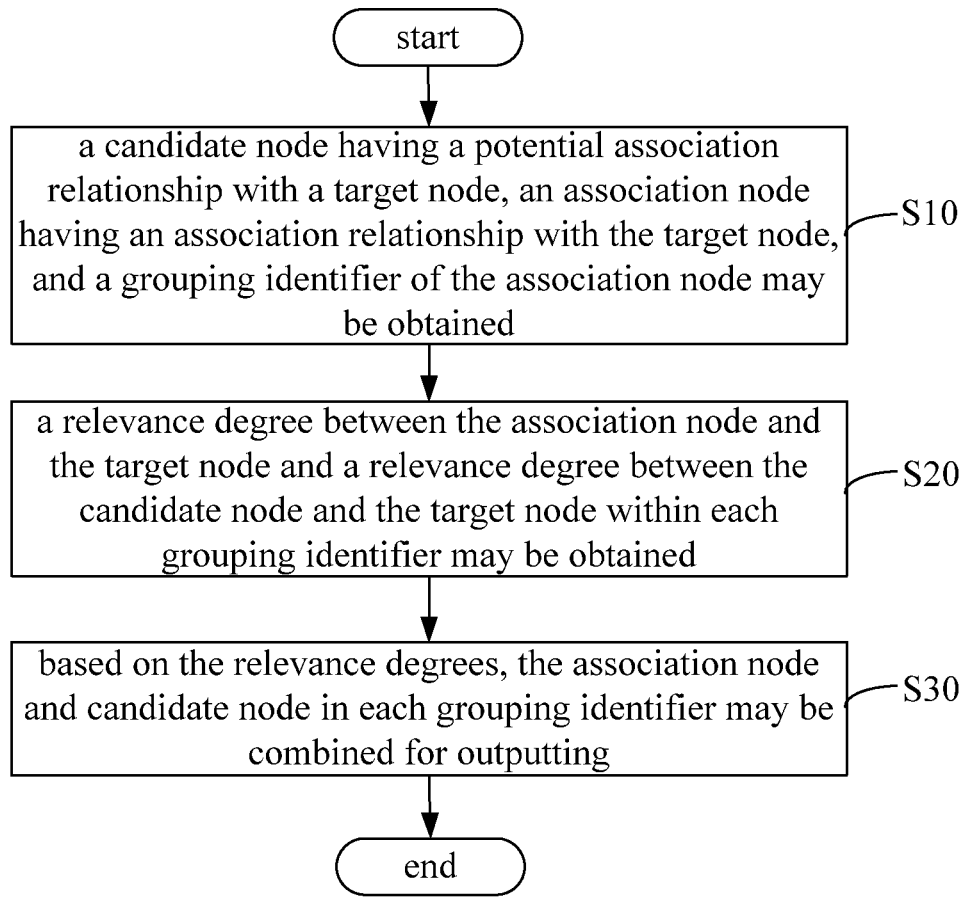
FIG. 1 is a flowchart illustrating a method for grouping social network nodes, according to an embodiment of the present disclosure.

As shown in FIG. 1, according to an embodiment of the present disclosure, a method for grouping nodes in a social network may include following operations.

In block S10, a candidate node having a potential association relationship with a target node, an association node having an association relationship with the target node, and a grouping identifier of the association node may be obtained.

In this case, a user in the social network may be selected as the target node. A user having a buddy relationship with the user may be regarded as the association node, i.e., a node having the association relationship with the target node may be regarded as the association node. A user having a potential buddy relationship with the user may be regarded as the candidate node, i.e., a node having the potential association relationship with the target node may be regarded as the candidate node. According to an embodiment of the present disclosure, the potential association relationship may be defined to mean that there may be a possibility for the candidate node to have the association relationship with the target node. The candidate node having the potential association relationship with the target node may be obtained in advance. The candidate node may be placed in a candidate node list. A candidate node associated with the target node may be obtained from the candidate node list. According to embodiments of the present disclosure, there may be various ways for obtaining the candidate node from the candidate node list. For example, a matching weight of attribute information of the target node may be preconfigured. Attribute information of nodes which do not have the association relationship with the target node may be compared with the attribute information of the target node, so as to obtain weights of the nodes which do not have the association relationship with the target node. When a weight of a node that does not have the association relationship with the target node is greater than a threshold, the node may be regarded as the candidate node. The attribute information of a node may include true information such as gender, age, constellation, a blood type, a graduate school, a major, a graduation date, a native place, a location where the node locates, a job, hobbies, and so forth. When the social network is a virtual social network, the attribute information of the node may further include an area where the node locates in the virtual world, attributes of a virtual character, a level of the virtual character, and etc.

According to an embodiment of the present disclosure, the grouping identifier may include but not be limited to junior high school classmate, senior high school classmate, college schoolmate, colleague, family, and etc. According to another embodiment of the present disclosure, the grouping identifier may be a group number (ID), such as group 001, group 002.

In block S20, a relevance degree between the association node and the target node and a relevance degree between the candidate node and the target node within each grouping identifier may be obtained.

In this case, according to an embodiment of the present disclosure, the relevance degree between the candidate node and the target node may be obtained according to the grouping identifier, and the relevance degree between the association node in each grouping identifier and the target node may be obtained. The relevance degree may refer to a matching degree between the attribute information of the target node and the attribute information of the candidate node, or between the attribute information of the target node and the attribute information of the association node. According to an embodiment of the present disclosure, the relevance degree may be defined to mean a similarity degree of the attribute information between users.

Figure 2:
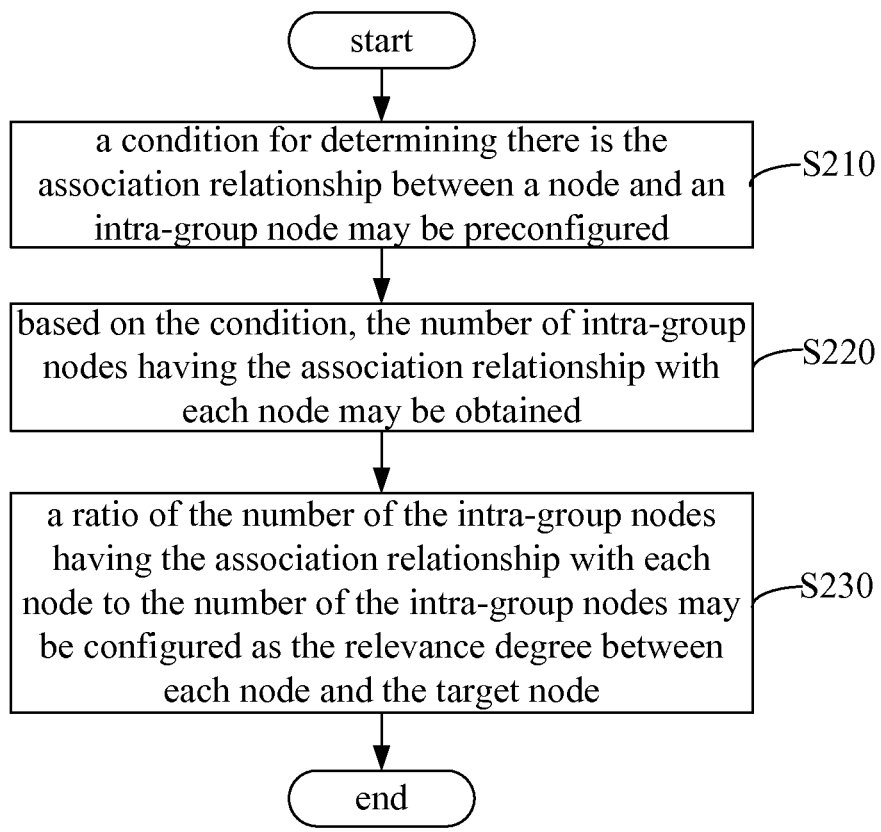
FIG. 2 is a flowchart illustrating a process at block S20, according to an embodiment of the present disclosure.

According to an embodiment of the present disclosure, as shown in FIG. 2, the operations in block S20 may be implemented as follows.

In block S210, a condition for determining there is the association relationship between a node and an intra-group node may be preconfigured.

In this case, the target node, the association node, and the candidate node may be regarded as the node. Association relationships between the node and each intra-group node may be counted. According to an embodiment of the present disclosure, there may be two ways for obtaining the relevance degree of the node. According to a first way, when the intra-group nodes include the association nodes, the relevance degree of the node may be obtained by counting the number of intra-group association nodes having the association relationship with the node. According to a second way, when the intra-group nodes include the association nodes and the target node, the relevance degree of the node may be obtained by counting the number of the intra-group association nodes plus the target node, in which the intra-group association nodes have the association relationship with the node.

According to an embodiment of the present disclosure, the preconfigured condition for determining there is the association relationship between the node and the intra-group node may include at least one of the following conditions.

A first condition may be that the node itself is the intra-group node.

For example, when group 001 of target node A includes association node B, then association node B is an intra-group association node. When association node B is regarded as the node and the number of nodes in group 001 that may have the association relationship with association node B is counted, association node B itself may be counted.

A second condition may be that the node has the association relationship with the intra-group node.

For example, group 001 of target node A includes association node B, association node C, and association node D, in which association node B has the association relationship with association node C. When association node B is regarded as the node and the number of nodes in group 001 that may have the association relationship with association node B is counted, association node C meets the second condition and is regarded as a node in group 001 that has the association relationship with association node B.

A third condition may be that when the node has the association relationship with a predetermined number of candidate nodes and the predetermined number of candidate nodes have the association relationship with the intra-group node, the node may have the association relationship with the intra-group node.

In this case, an intra-group association node may be a buddy of the user, and a candidate node may likely to be a buddy of the user. For example, group 001 of target node A may include association node B, association node C, and association node D. Candidate nodes outside the group may include nodes E, F, G, and H. The predetermined number may be three. Assuming candidate node E has the association relationship with candidate nodes F, G and H, and association node B also has the association relationship with the candidate nodes F, G, and H, when candidate node E is regarded as the node and the number of nodes in group 001 that may have the association relationship with candidate node E is counted, association node B meets the third condition and is regarded as a node in group 001 that has the association relationship with candidate node E.

In block S220, based on the condition, the number of intra-group nodes having the association relationship with each node may be obtained.

For example, based on the condition, the number of nodes in group 001 that may have the association relationship with association node B may be counted, and the number of nodes in group 002 that may have the association relationship with association node B may be counted.

In block S230, a ratio of the number of the intra-group nodes having the association relationship with each node to the number of the intra-group nodes may be configured as the relevance degree between each node and the target node.

Figure 3:
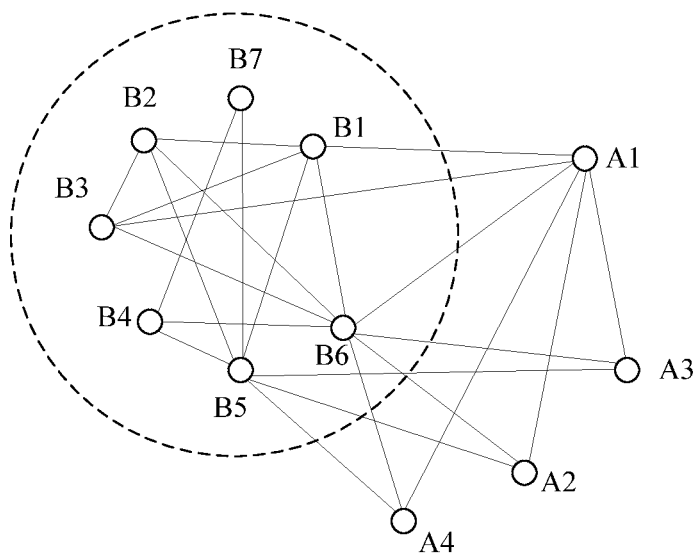
FIG. 3 is a schematic diagram illustrating a node relationship, according to an embodiment of the present disclosure.

Hereinafter, the process for obtaining the relevance degree between each node and the target node may be described in further detail. As shown in FIG. 3, assuming there is a group G1 that has the association relationship with a target node A, in which group G1 includes seven association nodes including B1 to B7 and four candidate nodes including A1 to A4. The predetermined number may be three. According to an embodiment of the present disclosure, assuming the intra-group nodes include the association nodes, the nodes in G1 that may have the association relationship with A1 may include B1 (which meets the second condition), B3 (which meets the second condition), B6 (which meets the second condition and the third condition), and B5 (which meets the third condition), as such, the relevance degree of A1 may be 4/7. The nodes in G1 that may have the association relationship with B5 may include B5 (which meets the first condition), B1 (which meets the second condition), B2 (which meets the second condition), B4 (which meets the second condition), B7 (which meets the second condition), and B6 (which meets the third condition), as such, the relevance degree of B5 may be 6/7. When the relevance degree is obtained in accordance with the situation that the intra-group nodes include the association nodes, it may be beneficial for obtaining the relevance degree of the candidate node that is greater than the relevance degree of the association node. As such, when the nodes are sorted in a descending order of the relevance degrees, more candidate nodes may be arranged ahead, which may facilitate operations to the candidate nodes.

According to another embodiment of the present disclosure, assuming the intra-group nodes include the association nodes and the target node, i.e., the target node may be regarded as a statistic node for obtaining the relevance degree, as such, the nodes in the group G1 having the association relationship with A1 may include B1 (which meets the second condition), B3 (which meets the second condition), B6 (which meets the second condition and the third condition), and B5 (which meets the third condition), so that the relevance degree of A1 may be 4/8. The nodes in the group G1 having the association relationship with B5 may include B5 (which meets the first condition), B1 (which meets the second condition), B2 (which meets the second condition), B4 (which meets the second condition), B7 (which meets the second condition), B6 (which meets the third condition), and the target node A, so that the relevance degree of B5 may be 7/8.

In block S30, based on the relevance degrees, the association node and candidate node in each grouping identifier may be combined for outputting.

According to an embodiment of the present disclosure, the association node and the candidate node in each group may be combined discretionarily and then output.

According to an embodiment of the present disclosure, the operations in block S30 may be implemented as follows. The association node and the candidate node in each grouping identifier may be sorted based on the relevancy degrees. The sorted association node and candidate node may be presented according to the grouping identifier.

Specifically, in each grouping identifier, the association node and the candidate node in the group may be sorted based on the relevance degrees. As shown in FIG. 3, in the grouping identifier G1, the relevance degrees of A1, A2, A3, and A4 respectively are 4/7, 2/7, 2/7, and 2/7, and the relevance degrees of B1, B2, B3, B4, B5, B6, and B7 respectively are 5/7, 5/7, 4/7, 4/7, 6/7, 6/7, and 3/7. When these nodes are sorted in a descending order of the relevance degrees, the nodes may be presented as B5, B6, B1, B2 B3, B4, A1, B7, A2, A3, and A4. According to another embodiment of the present disclosure, the nodes may be sorted in an ascending order of the relevancy degrees.

Figure 4:
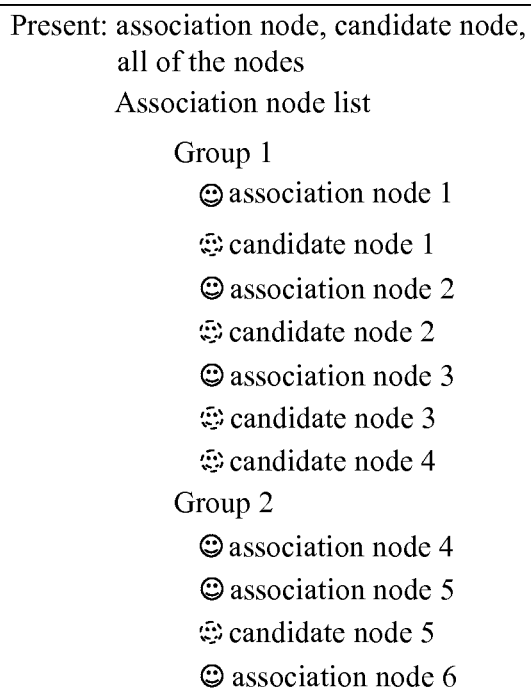
FIG. 4 is a schematic diagram illustrating the presenting of association nodes and candidate nodes, according to an embodiment of the present disclosure.

After each group is sorted, the sorted association node and candidate node may be presented according to the grouping identifier. As shown in FIG. 4, there are three option controls on a display interface, which may display the association node, or display the candidate node, or display all of the nodes. An association node list includes group 1 and group 2. Group 1 includes association node 1, candidate node 1, association node 2, candidate node 2, association node 3, candidate node 3, and candidate node 4. Group 2 includes association node 4, association node 5, candidate node 5, and association node 6. According to an embodiment of the present disclosure, when the association node and the candidate node are presented, the association node and the candidate node may be marked with different labels for distinguishing purpose. As shown in FIG. 4, a solid-line smiley may be marked before an association node and a dotted-line smiley may be marked before a candidate node. According to embodiments of the present disclosure, the label may be configured by either the user or the system.

According to an embodiment of the present disclosure, when the relevancy degree of the candidate node in the grouping identifier is 0, the candidate node may be hidden in the grouping identifier, alternatively, the candidate node may not be added to the grouping identifier. For example, when group 001 is processed, a relevancy degree between candidate node H and the target node is 0, so that candidate node H may not be added to group 001. When group 002 is processed, the relevancy degree between candidate node H and the target node is not equal to 0, so that candidate node H may be added to group 002.

According to another embodiment of the present disclosure, in the method for grouping the social network nodes, the operation of sorting, based on the relevancy degrees, the association node and the candidate node in each grouping identifier may include sorting the association node and the candidate node in each grouping identifier in the descending order of the relevancy degrees.

According to an embodiment of the present disclosure, the operation of presenting the sorted association node and candidate node according to the grouping identifier may include presenting, within each grouping identifier, a predetermined number or a user-determined number of sorting results with high relevancy degrees. For example, referring to FIG. 3 again, in group G1, the relevance degrees of A1, A2, A3, and A4 respectively are 4/7, 2/7, 2/7, and 2/7, and the relevance degrees of B1, B2, B3, B4, B5, B6, and B7 respectively are 5/7, 5/7, 4/7, 4/7, 6/7, 6/7, and 3/7. When these nodes are sorted in the descending order of the relevance degrees, the nodes may be presented as B5, B6, B1, B2, B3, B4, A1, B7, A2, A3, and A4. When the predetermined number is 7, B5, B6, B1, B2, B3, B4, and A1 may be presented. When the user-determined number is 6, B5, B6, B1, B2, B3, and B4 may be presented. In addition, the user-determined number may be adjusted by the user at any time.

According to another embodiment of the present disclosure, in the method for grouping the social network nodes, after obtaining the relevancy degree between the association node and the target node and the relevancy degree between the candidate node and the target node in each group, the method further include configuring a relevancy threshold and hiding a candidate node of which a relevancy degree is less than the relevancy threshold. Thereafter, in each group in which the candidate node of which the relevancy degree is less than the relevancy threshold is hidden, the association node and the candidate node are sorted according to the relevancy degrees, and the sorted association node and candidate node are presented according to the grouping identifier. According to an embodiment of the present disclosure, the relevancy threshold may be configured by either the user or the system according to requirements. When the relevancy threshold is preconfigured, it may be determined whether a relevancy degree of a candidate node is less than the relevancy threshold. In response to determining that the relevancy degree of the candidate node is less than the relevancy threshold, the candidate node may be hidden. In response to determining that the relevancy degree of the candidate node is equal to or greater than the relevancy threshold, the candidate node may be presented. In an embodiment, all of association nodes of the target node may be presented to the user. In addition, the user may configure the relevancy threshold at any time according to the requirements. For example, a slider control may be configured on an interface, and the relevancy threshold may be adjusted through sliding the slider control. According to another embodiment, after the sorted association node and candidate node are presented, the candidate node of which the relevancy degree is less than the relevancy threshold may be hidden based on the relevancy threshold configured by the user.

According to another embodiment of the present disclosure, in the method for grouping the social network nodes, within each group in which the candidate node of which the relevancy degree is less than the relevancy threshold is hidden, the association node and the candidate node may be sorted in the descending order of the relevancy degrees, and the predetermined number or the user-determined number of sorting results with high relevancy degrees may be presented within each grouping identifier.

According to another embodiment of the present disclosure, the method for grouping the social network nodes may further include obtaining a display setting selected by the user, and presenting the sorted association node and candidate node according to the display setting and the grouping identifier. Specifically, the display setting selected by the user may include any one of presenting the association node, presenting the candidate node, and presenting all of the nodes. The presenting may be performed according to a corresponding display setting. For example, referring to FIG. 3 again, when the display setting is configured to present the association node, the association nodes B1 to B7 may be presented. When the display setting is configured to present the candidate node, the candidate nodes A1 to A4 may be presented. When the display setting is configured to present all of the nodes, all of the sorted association node and candidate node may be presented.

According an embodiment of the present disclosure, when the method for grouping the social network nodes is applied to the grouping of buddies and potential buddies of the user, the method may include following operations.

At step (a), a potential buddy of the user, a buddy grouping identifier, and an intra-group buddy of the user may be obtained.

In this case, the potential buddy of the user may refer to a person whom the user may know or a person who may become a buddy of the user. The potential buddy may be a candidate node. The buddy grouping identifier may be a grouping identifier. The intra-group buddy may be an association node. According to an embodiment of the present disclosure, a potential buddy list may be obtained, and the potential buddy of the user may be obtained from the potential buddy list. There may be various ways for obtaining the potential buddy from the potential buddy list. For example, a matching weight of personal attribute information of the user may be preconfigured, then personal attribute information of a non-buddy user and the personal attribute information of the user may be compared to obtain a weight of the non-buddy user, and a non-buddy user of which a weight is greater than a threshold may be regarded as the potential buddy. The personal attribute information of the user may include true information such as gender, age, constellation, a blood type, a graduate school, a major, a graduation date, a native place, a location where the user locates, a job, hobbies, and so forth. When the social network is a virtual social network, the personal attribute information of the user may further include an area where the user locates in the virtual world, attributes of a virtual character, a level of the virtual character, and etc.

According to an embodiment of the present disclosure, the buddy grouping identifier may include but not be limited to junior high school classmate, senior high school classmate, college schoolmate, colleague, family, and etc. For example, a junior high school classmate user B in a junior high school classmate group of user A may be an intra-group buddy of user A.

At step (b), a relevancy degree between the buddy and the user and a relevancy degree between the potential buddy and the user in each group may be obtained.

In this case, the potential buddy and the intra-group buddy may be preconfigured as a node, and a condition for determining there is an association relationship between the node and an intra-group node may be preconfigured. The condition may refer to the aforementioned condition for determining there is the association relationship between a node and an intra-group node in the grouping identifier, which is not repeated herein.

At step (c), based on the relevancy degrees, the buddy and potential buddy in each group may be combined for outputting.

According to an embodiment of the present disclosure, the operations in step (c) may be implemented as follows.

At step (c1), the buddy and the potential buddy in each group may be sorted according to the relevancy degrees.

At step (c2), the sorted buddy and potential buddy may be presented based on the buddy grouping identifier.

Figure 5:
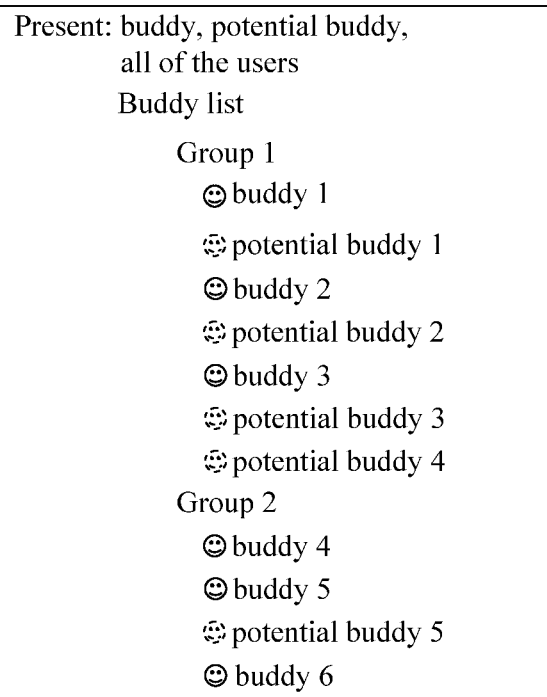
FIG. 5 is a schematic diagram illustrating the presenting of buddies and potential buddies, according to an embodiment of the present disclosure.

In this case, when each group is sorted, the sorted buddy and potential buddy may be presented based on the buddy grouping identifier. As shown in FIG. 5, there are three option controls on a display interface, which may display the buddy, or display the potential buddy, or display all of the users. A buddy list includes group 1 and group 2. Group 1 includes buddy 1, potential buddy 1, buddy 2, potential buddy 2, buddy 3, potential buddy 34, and potential buddy 4. Group 2 includes buddy 4, buddy 5, potential buddy 5, and buddy 6.

Further, when the method for grouping the social network nodes is applied to the grouping of buddies and potential buddies of the user, the method may include following operations after step (b).

At step (e), a relevancy threshold may be configured. A potential buddy of which a relevancy degree is less than the relevancy threshold may be hidden.

In this case, the relevancy threshold may be configured by either the user or the system according to requirements. When the relevancy threshold is preconfigured, it may be determined whether a relevancy degree of a potential buddy is less than the relevancy threshold. In response to determining that the relevancy degree of the potential buddy is less than the relevancy threshold, the potential buddy may be hidden. In response to determining that the relevancy degree of the potential buddy is equal to or greater than the relevancy threshold, the potential buddy may be presented. In an embodiment, all of buddies of the user may be presented to the user. In addition, the user may configure the relevancy threshold at any time according to the requirements. For example, a slider control may be configured on an interface, and the relevancy threshold may be adjusted through sliding the slider control.

According an embodiment of the present disclosure, when the method for grouping the social network nodes is applied to the grouping of buddies and potential buddies of the user, the method may further include following operations.

At step (f), a display setting selected by the user may be obtained, and the sorted buddy and potential buddy may be presented according to the display setting and the buddy grouping identifier.

In this case, the display setting selected by the user may include any one of presenting the buddy, presenting the potential buddy, and presenting all of the users. The presenting may be performed according to a corresponding display setting. For example, referring to FIG. 5 again, when the display setting is configured to present the buddy, the buddies 1 to 6 may be presented. When the display setting is configured to present the potential buddy, the potential buddies 1 to 5 may be presented. When the display setting is configured to present all of the users, all of the sorted buddies and potential buddies may be presented.

Figure 6:
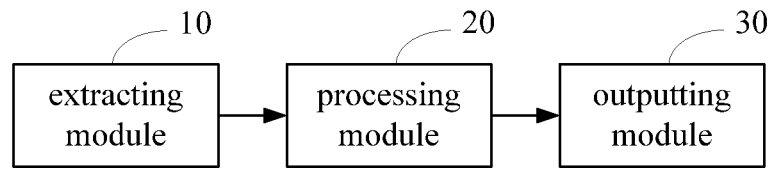
FIG. 6 is a schematic diagram illustrating a structure of an apparatus for grouping social network nodes, according to an embodiment of the present disclosure.

FIG. 6 is a schematic diagram illustrating a structure of an apparatus for grouping social network nodes, according to an embodiment of the present disclosure. The apparatus may include an extracting module 10, a processing module 20, and an outputting module 30.

The extracting module 10 may obtain a candidate node having a potential association relationship with a target node, an association node having an association relationship with the target node, and a grouping identifier of the association node.

In this case, a user in the social network may be selected as the target node. A user having a buddy relationship with the user may be regarded as the association node, i.e., a node having the association relationship with the target node may be regarded as the association node. A user having a potential buddy relationship with the user may be regarded as the candidate node, i.e., a node having the potential association relationship with the target node may be regarded as the candidate node. The candidate node having the potential association relationship with the target node may be obtained in advance. The candidate node may be placed in a candidate node list. A candidate node associated with the target node may be obtained from the candidate node list. According to embodiments of the present disclosure, there may be various ways for obtaining the candidate node from the candidate node list. For example, a matching weight of attribute information of the target node may be preconfigured. Attribute information of nodes which do not have the association relationship with the target node may be compared with the attribute information of the target node, so as to obtain weights of the nodes which do not have the association relationship with the target node. When a weight of a node that does not have the association relationship with the target node is greater than a threshold, the node may be regarded as the candidate node. The attribute information of a node may include true information such as gender, age, constellation, a blood type, a graduate school, a major, a graduation date, a native place, a location where the node locates, a job, hobbies, and so forth. When the social network is a virtual social network, the attribute information of the node may further include an area where the node locates in the virtual world, attributes of a virtual character, a level of the virtual character, and etc.

According to an embodiment of the present disclosure, the grouping identifier may include but not be limited to junior high school classmate, senior high school classmate, college schoolmate, colleague, family, and etc. According to another embodiment of the present disclosure, the grouping identifier may be a group number (ID), such as group 001, group 002.

The processing module 20 may obtain a relevance degree between the association node and the target node and a relevance degree between the candidate node and the target node within each grouping identifier. According to an embodiment of the present disclosure, the relevance degree between the candidate node and the target node may be obtained according to the grouping identifier, and the relevance degree between the association node in each grouping identifier and the target node may be obtained. The relevance degree may refer to a matching degree between the attribute information of the target node and the attribute information of the candidate node, or between the attribute information of the target node and the attribute information of the association node. According to an embodiment of the present disclosure, the relevance degree may be defined to mean a similarity degree of the attribute information between users.

Figure 7:
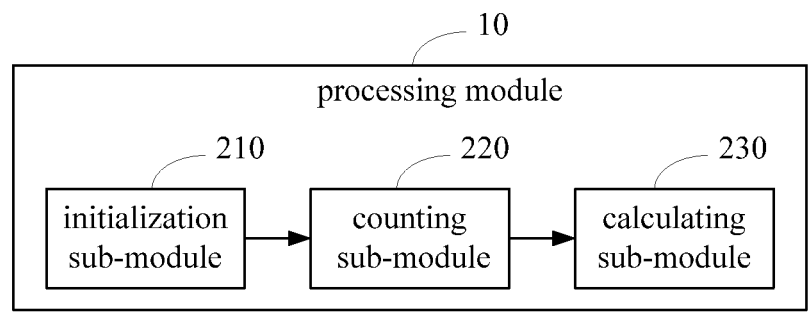
FIG. 7 is a schematic diagram illustrating a structure of a processing module, according to an embodiment of the present disclosure.

According to an embodiment of the present disclosure, as shown in FIG. 7, the processing module 20 may include an initialization sub-module 210, a counting sub-module 220, and an obtaining sub-module 230 (which is denoted as a calculating sub-module 230 in FIG. 7).

The initialization sub-module 210 may preconfigure a condition for determining there is the association relationship between a node and an intra-group node.

In this case, the target node, the association node, and the candidate node may be regarded as the node. Association relationships between the node and each intra-group node may be counted. According to an embodiment of the present disclosure, there may be two ways for obtaining the relevance degree of the node. According to a first way, when the intra-group nodes include the association nodes, the relevance degree of the node may be obtained by counting the number of intra-group association nodes having the association relationship with the node. According to a second way, when the intra-group nodes include the association nodes and the target node, the relevance degree of the node may be obtained by counting the number of the intra-group association nodes plus the target node, in which the intra-group association nodes have the association relationship with the node.

According to an embodiment of the present disclosure, the preconfigured condition for determining there is the association relationship between the node and the intra-group node may include at least one of the following conditions.

A first condition may be that the node itself is the intra-group node.

For example, when group 001 of target node A includes association node B, then association node B is an intra-group association node. When association node B is regarded as the node and the number of nodes in group 001 that may have the association relationship with association node B is counted, association node B itself may be counted.

A second condition may be that the node has the association relationship with the intra-group node.

For example, group 001 of target node A includes association node B, association node C, and association node D, in which association node B has the association relationship with association node C. When association node B is regarded as the node and the number of nodes in group 001 that may have the association relationship with association node B is counted, association node C meets the second condition and is regarded as a node in group 001 that has the association relationship with association node B.

A third condition may be that when the node has the association relationship with a predetermined number of candidate nodes and the predetermined number of candidate nodes have the association relationship with the intra-group node, the node may have the association relationship with the intra-group node.

In this case, an intra-group association node may be a buddy of the user, and a candidate node may likely to be a buddy of the user. For example, group 001 of target node A may include association node B, association node C, and association node D. Candidate nodes outside the group may include nodes E, F, G, and H. The predetermined number may be three. Assuming candidate node E has the association relationship with candidate nodes F, G and H, and association node B also has the association relationship with the candidate nodes F, G, and H, when candidate node E is regarded as the node and the number of nodes in group 001 that may have the association relationship with candidate node E is counted, association node B meets the third condition and is regarded as a node in group 001 that has the association relationship with candidate node E.

The counting sub-module 220 may obtain, based on the condition, the number of intra-group nodes having the association relationship with each node. For example, based on the condition, the number of nodes in group 001 that may have the association relationship with association node B may be counted, and the number of nodes in group 002 that may have the association relationship with association node B may be counted.

The obtaining sub-module 230 may configure a ratio of the number of the intra-group nodes having the association relationship with each node to the number of the intra-group nodes as the relevance degree between each node and the target node, which may refer to FIG. 3 and not be repeated herein.

According to an embodiment of the present disclosure, assuming the intra-group nodes include the association nodes and the target node, i.e., the target node may be regarded as a statistic node for obtaining the relevance degree, as such, the nodes in the group G1 having the association relationship with A1 may include B1 (which meets the second condition), B3 (which meets the second condition), B6 (which meets the second condition and the third condition), and B5 (which meets the third condition), so that the relevance degree of A1 may be 4/8. The nodes in the group G1 having the association relationship with B5 may include B5 (which meets the first condition), B1 (which meets the second condition), B2 (which meets the second condition), B4 (which meets the second condition), B7 (which meets the second condition), B6 (which meets the third condition), and the target node A, so that the relevance degree of B5 may be 7/8.

The outputting module 30 may combine, based on the relevance degrees, the association node and candidate node in each grouping identifier and output the association node and candidate node.

According to an embodiment of the present disclosure, the outputting module 30 may discretionarily combine the association node and the candidate node in each group and output the association node and the candidate node.

Figure 8:
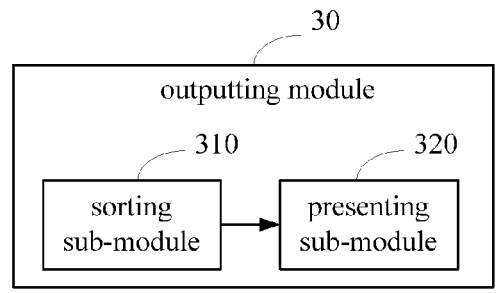
FIG. 8 is a schematic diagram illustrating a structure of an outputting module, according to an embodiment of the present disclosure.

According to an embodiment of the present disclosure, as shown in FIG. 8, the outputting module 30 may include a sorting sub-module 310 and a presenting sub-module 320.

The sorting sub-module 310 may sort, based on the relevancy degrees, the association node and the candidate node in each grouping identifier. Specifically, in each grouping identifier, the association node and the candidate node in the grouping identifier may be sorted based on the relevance degrees. As shown in FIG. 3, in the grouping identifier G1, the relevance degrees of A1, A2, A3, and A4 respectively are 4/7, 2/7, 2/7, and 2/7, and the relevance degrees of B1, B2, B3, B4, B5, B6, and B7 respectively are 5/7, 5/7, 4/7, 4/7, 6/7, 6/7, and 3/7. When these nodes are sorted in a descending order of the relevance degrees, the nodes may be presented as B5, B6, B1, B2, B3, B4, A1, B7, A2, A3, and A4. According to another embodiment of the present disclosure, the nodes may be sorted in an ascending order of the relevancy degrees.

The presenting sub-module 320 may present the sorted association node and candidate node according to the grouping identifier.

In this case, after each group is sorted, the sorted association node and candidate node may be presented according to the grouping identifier. As shown in FIG. 4, there are three option controls on a display interface, which may display the association node, or display the candidate node, or display all of the nodes. An association node list includes group 1 and group 2. Group 1 includes association node 1, candidate node 1, association node 2, candidate node 2, association node 3, candidate node 3, and candidate node 4. Group 2 includes association node 4, association node 5, candidate node 5, and association node 6.

According to an embodiment of the present disclosure, when the association node and the candidate node are presented, the association node and the candidate node may be marked with different labels for distinguishing purpose. As shown in FIG. 4, a solid-line smiley may be marked before an association node and a dotted-line smiley may be marked before a candidate node. According to embodiments of the present disclosure, the label may be configured by either the user or the system.

According to an embodiment of the present disclosure, when the relevancy degree of the candidate node in the grouping identifier is 0, the candidate node may be hidden in the grouping identifier, alternatively, the candidate node may not be added to the grouping identifier. For example, when group 001 is processed, a relevancy degree between candidate node H and the target node is 0, so that candidate node H may not be added to group 001. When group 002 is processed, the relevancy degree between candidate node H and the target node is not equal to 0, so that candidate node H may be added to group 002.

According to another embodiment of the present disclosure, the sorting sub-module 310 may sort the association node and the candidate node in each group in a descending order of the relevancy degrees. The presenting sub-module 320 may present, within each grouping identifier, a predetermined number or a user-determined number of sorting results with high relevancy degrees. For example, referring to FIG. 3 again, in group G1, the relevance degrees of A1, A2, A3, and A4 respectively are 4/7, 2/7, 2/7, and 2/7 and the relevance degrees of B1, B2, B3, B4, B5, B6, and B7 respectively are 5/7, 5/7, 4/7, 4/7, 6/7, 6/7, and 3/7. When these nodes are sorted in the descending order of the relevance degrees, the nodes may be presented as B5, B6, B1, B2, B3, B4, A1, B7, A2, A3, and A4. When the predetermined number is 7, B5, B6, B1, B2, B3, B4, and A1 may be presented. When the user-determined number is 6, B5, B6, B1, B2, B3, and B4 may be presented.

Figure 9:
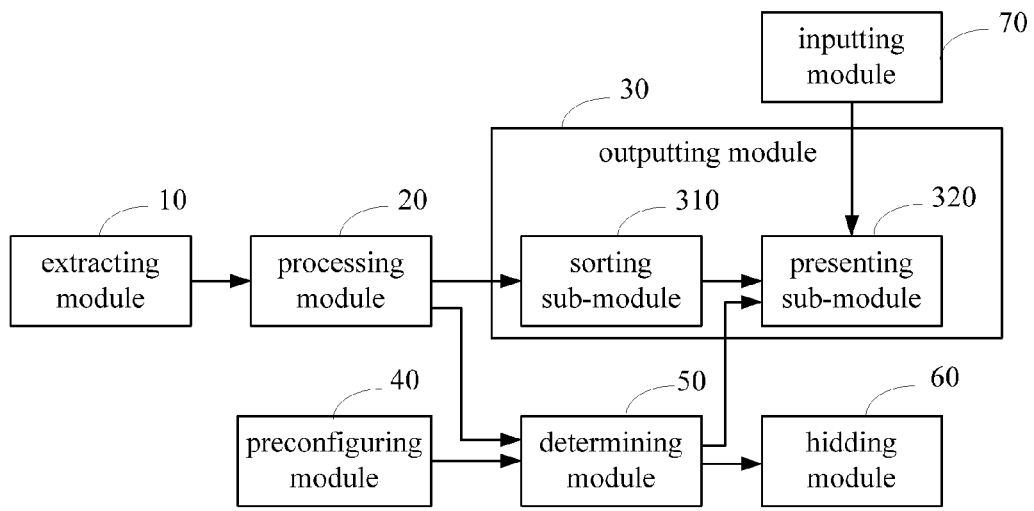
FIG. 9 is a schematic diagram illustrating a structure of an apparatus for grouping social network nodes, according to another embodiment of the present disclosure.

As shown in FIG. 9, in addition to the extracting module 10, the processing module 20, and the outputting module 30, the apparatus for grouping the social network nodes may further include a preconfiguring module 40, a determining module 50, a hiding module 60, and an inputting module 70.

The preconfiguring module 40 may configure a relevancy threshold. According to an embodiment of the present disclosure, the relevancy threshold may be configured by either the user or the system according to requirements.

The determining module 50 may determine whether a relevancy degree of a candidate node is less than the relevancy threshold.

The hiding module 60 may hide the candidate node in response to determining that the relevancy degree of the candidate node is less than the relevancy threshold.

The sorting sub-module 310 may sort, within each group in which the candidate node of which the relevancy degree is less than the relevancy threshold is hidden, the association node and the candidate node based on the relevancy degrees.

The presenting sub-module 320 may present the association node and the candidate node sorted based on the relevancy degrees within each group in which the candidate node of which the relevancy degree is less than the relevancy threshold is hidden.

The inputting module 70 may obtain a display setting selected by the user. Specifically, the display setting selected by the user may include any one of presenting the association node, presenting the candidate node, and presenting all of the nodes. The presenting may be performed according to a corresponding display setting. For example, referring to FIG. 3 again, when the display setting is configured to present the association node, the association nodes B1 to B7 may be presented. When the display setting is configured to present the candidate node, the candidate nodes A1 to A4 may be presented. When the display setting is configured to present all of the nodes, all of the sorted association node and candidate node may be presented.

The presenting sub-module 320 may present the sorted association node and candidate node according to the display setting and the grouping identifier.

According to another embodiment of the present disclosure, in the apparatus for grouping the social network nodes, the sorting sub-module 310 may sort, within each group in which the candidate node of which the relevancy degree is less than the relevancy threshold is hidden, the association node and the candidate node in the descending order of the relevancy degrees. The presenting sub-module 320 may present a predetermined number or a user-determined number of sorting results with high relevancy degrees within each grouping identifier.

When the apparatus for grouping the social network nodes is applied to the grouping of buddies and potential buddies of the user, corresponding procedures may refer to the operations in the aforementioned method, in which a corresponding step may be implemented by a corresponding module, which are not repeated herein.

According to various embodiments of the present disclosure, in the method and apparatus for grouping the social network nodes as described above, the candidate node having the potential association relationship with the target node, the association node having the association relationship with the target node, and the grouping identifier of the association node can be obtained. The relevance degree of the candidate node and the relevance degree of the association node within each grouping identifier can be obtained. Based on the relevance degrees, the association node and the candidate node in each grouping identifier can be combined for outputting. The method and apparatus described in the various embodiments of the present disclosure can facilitate the operation, reduce the operations implemented by the user for adding the candidate node, and improve the response efficiency of the system.

In addition, the relevant threshold is configured and part of candidate nodes can be hidden, so that the presenting space can be saved. Further, the association nodes and the candidate nodes can be presented according to the display setting selected by the user, and therefore the presenting is flexible.

Those skilled in the art may understand that all or part of the procedures of the methods of the above embodiments may be implemented by hardware modules following computer readable instructions. The computer readable instructions may be stored in a computer-readable storage medium. When running, the computer readable instructions may provide the procedures of the method embodiments as described above. The storage medium may be diskette, CD, ROM (Read-Only Memory) or RAM (Random Access Memory), and etc.

What has been described and illustrated herein is an embodiment of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for recommending friends to a user of a social networking group, performed by a computing device, comprising:
obtaining user identifiers of members of the social networking group;
dividing the members of the social networking group into a first set of members that have a direct relationship with the user and a second set of members that have no direct relationship with the user;
for each of the user identifiers of the social networking group:
determining a total number of members within the first set of members whose relationship with a corresponding member satisfy at least one of a set of predefined conditions including:
the corresponding member being a member of the first set of members;
the corresponding member having the direct relationship with a member of the first set of members; and
when the corresponding member has the direct relationship with a predetermined number of members of the second set of members and the predetermined number of members of the second set of members have the direct relationship with a member of the first set of members, the corresponding member having the relationship with a member of the first set of members;
dividing the total number of members within the first set of members whose relationship with the corresponding member satisfy at least one of the set of predefined conditions by a total number of members within the first set of members as a relevance degree between the corresponding member and the other members of the social networking group;
displaying the user identifiers of the members in the social networking group according to their respective calculated relevance degrees, wherein at least one member in the second set of members has a relevance degree higher than that of at least one member in the first set of members;
receiving a user selection of the user identifier of the at least one member in the second set of members; and
establishing a direct relationship between the user and the at least one member in the second set of members.

2. The method of claim 1, wherein the operation of displaying the user identifiers of the members in the social networking group comprises:
sorting the user identifiers of the members in the social networking group based on their respective calculated relevancy degrees; and
displaying the sorted user identifiers of the members in the social networking group.

3. The method of claim 2, wherein before the operation of sorting, the method further comprises:
hiding based on a preconfigured relevancy threshold, a user identifier of a member in the second set of members of which a relevancy degree is less than the relevancy threshold;
wherein the operation of sorting the user identifiers of the members in the social networking group comprises:
after the hiding the user identifier of the member in the second set of members of which the relevancy degree is less than the relevancy threshold, sorting remaining user identifiers of the members in the social networking group based on their respective calculated relevancy degrees.

4. The method of claim 2, wherein the operation of sorting comprises:
sorting the user identifiers of the members in the social networking group in a descending order of the relevancy degrees;
wherein the operation of displaying comprises:
displaying a predetermined number or a user-determined number of sorting results with high relevancy degrees.

5. The method of claim 2, further comprising:
obtaining a display setting selected by a user; and
displaying the sorted user identifiers of the members in the social networking group according to the display setting.

6. An apparatus for recommending friends to a user of a social networking group, comprising:
a processor and a memory which stores computer-readable instructions being executed by the processor to:
obtain user identifiers of members of the social networking group;
divide the members of the social networking group into a first set of members that have a direct relationship with the user and a second set of members that have no direct relationship with the user;
for each of the user identifiers of the social networking group:
determine a total number of members within the first set of members whose relationship with a corresponding member satisfy at least one of a set of predefined conditions including:
the corresponding member being a member of the first set of members;
the corresponding member having the direct relationship with a member of the first set of members; and
when the corresponding member has the direct relationship with a predetermined number of members of the second set of members and the predetermined number of members of the second set of members have the direct relationship with a member of the first set of members, the corresponding member having the relationship with a member of the first set of members;
divide the total number of members within the first set of members whose relationship with the corresponding member satisfy at least one of the set of predefined conditions by a total number of members within the first set of members as a relevance degree between the corresponding member and the other members of the social networking group; and
display the user identifiers of the members in the social networking group according to their respective calculated relevance degrees, wherein at least one member in the second set of members has a relevance degree higher than that of at least one member in the first set of members;

receive a user selection of the user identifier of the at least one member in the second set of members; and establish a direct relationship between the user and the at least one member in the second set of members.

7. The apparatus of claim 6, wherein the instructions are executable by the processor to:

sort the user identifiers of the members in the social networking group based on their respective calculated relevancy degrees; and display the sorted user identifiers of the members in the social networking group.

8. The apparatus of claim 7, wherein the instructions are executable by the processor to:

preconfigure a relevancy threshold;

determine whether a relevancy degree of a member in the second set of members is less than the relevancy threshold; and hide a user identifier of the member in the second set of members of which the relevancy degree is less than the relevancy threshold;

after hiding the user identifier of the member in the second set of members of which the relevancy degree is less than the relevancy threshold, sort remaining user identifiers of the members in the social networking group based on their respective calculated relevancy degrees.

9. The apparatus of claim 7, wherein the instructions are executable by the processor to sort user identifiers of the members in the social networking group in a descending order of the relevancy degrees; and display a predetermined number or a user-determined number of sorting results with high relevancy degrees.

10. The apparatus of claim 7, wherein the instructions are executable by the processor to:

obtain a display setting selected by a user;

display the sorted user identifiers of the members in the social networking group according to the display setting.

11. A non-transitory computer-readable storage medium encoded with a plurality of instructions that when executed by one or more computers cause the one or more computers to perform operations for recommending friends to a user of a social networking group, the operations comprising:

obtaining user identifiers of members of the social networking group;

dividing the members of the social networking group into a first set of members that have a direct relationship with the user and a second set of members that have no direct relationship with the user;

for each of the user identifiers of the social networking group:

determining a total number of members within the first set of members whose relationship with a corresponding member satisfy at least one of a set of predefined conditions including:

the corresponding member being a member of the first set of members;

the corresponding member having the direct relationship with a member of the first set of members; and when the corresponding member has the direct relationship with a predetermined number of members of the second set of members and the predetermined number of members of the second set of members have the direct relationship with a member of the first set of members, the corresponding member having the relationship with a member of the first set of members;

dividing the total number of members within the first set of members whose relationship with the corresponding member satisfy at least one of the set of predefined conditions by a total number of members within the first set of members as a relevance degree between the corresponding member and the other members of the social networking group;

displaying the user identifiers of the members in the social networking group according to their respective calculated relevance degrees, wherein at least one member in the second set of members has a relevance degree higher than that of at least one member in the first set of members;

receiving a user selection of the user identifier of the at least one member in the second set of members; and establishing a direct relationship between the user and the at least one member in the second set of members.

12. The non-transitory computer-readable storage medium of claim 11, wherein the operation of displaying the user identifiers of the members in the social networking group comprises:

sorting the user identifiers of the members in the social networking group based on their respective calculated relevancy degrees; and displaying the sorted user identifiers of the members in the social networking group.

13. The non-transitory computer-readable storage medium of claim 12, before the operation of sorting, further comprising instructions that cause the one or more computers to perform operations comprising:

hiding, based on a preconfigured relevancy threshold, a user identifier of a member in the second set of members of which a relevancy degree is less than the relevancy threshold;

wherein the operation of sorting the user identifiers of the members in the social networking group comprises:

after the hiding the user identifier of the member in the second set of members of which the relevancy degree is less than the relevancy threshold, sorting remaining user identifiers of the members in the social networking group based on their respective calculated relevancy degrees.

14. The non-transitory computer-readable storage medium of claim 13, wherein the operation of sorting comprises:

sorting the user identifiers of the members in the social networking group in a descending order of the relevancy degrees;

wherein the operation of displaying comprises:

displaying a predetermined number or a user-determined number of sorting results with high relevancy degrees.

15. The non-transitory computer-readable storage medium of claim 13, further comprising instructions that cause the one or more computers to perform operations comprising:

obtaining a display setting selected by a user; and displaying the sorted user identifiers of the members in the social networking group according to the display setting.

* * * * *